United States Patent [19]

Phillips et al.

[11] 4,355,303

[45] Oct. 19, 1982

[54] RECEIVER FOR A DISTRIBUTION NETWORK POWER LINE CARRIER COMMUNICATION SYSTEM

[75] Inventors: John S. Phillips, Raleigh; Waymon A. Melvin, Jr., St. Matthews Twsp., both of N.C.

[73] Assignee: Westinghouse Electric Corp., Pittsburgh, Pa.

[21] Appl. No.: 252,664

[22] Filed: Apr. 9, 1981

[51] Int. Cl.³ .................... H04B 3/02; H04B 15/00
[52] U.S. Cl. .......................... 340/310 A; 328/169; 328/171; 333/173
[58] Field of Search ............... 340/310 A, 310 R; 328/169, 167, 168, 163, 171, 175; 333/173, 176; 329/130, 131, 134, 141, 104

[56] References Cited

U.S. PATENT DOCUMENTS

| | | | |
|---|---|---|---|
| 3,857,048 | 12/1974 | deLaage deMeux et al. | 328/175 |
| 3,868,605 | 2/1975 | Poole | 333/176 |
| 3,898,573 | 8/1975 | Sherman | 328/171 |
| 4,016,429 | 4/1977 | Vercellotti et al. | 340/310 R |
| 4,103,243 | 7/1978 | Orban | 328/169 |
| 4,134,074 | 1/1979 | Hershberger | 328/163 |
| 4,142,178 | 2/1979 | Whyte et al. | 340/310 R |
| 4,298,970 | 11/1981 | Shawhan et al. | 333/173 |

OTHER PUBLICATIONS

"Automatic Gain Control Operates Over Two Decades", Carl Marco, *Electronics*, Aug. 16, 1973, pp. 99–100.

*Primary Examiner*—Donald J. Yusko
*Attorney, Agent, or Firm*—D. R. Lackey

[57] ABSTRACT

A receiver for a distribution network power line carrier communication system is magnetically coupled to a distribution power line. A carrier signal, phase-shift keyed modulated by an information signal and carried by the distribution power line, is thereby coupled to the receiver circuitry. A first receiver amplification circuit includes an automatic gain control circuit, to prevent saturation of the receiver electronics, and a feedback circuit to determine the gain. The automatic gain control circuit utilizes a field effect transistor which cooperates with the amplifier's feedback circuit to modify the gain. The drain source resistance of the field effect transistor is varied in accord with the magnitude of the received noise or modulated carrier signal to lower the amplifier's gain when excessive positive or negative noise or modulated carrier signal peaks are encountered. The modulated carrier signal is then processed through several filter stages and further amplified. Finally, the information signal is removed from the modulated carrier by a phase shift keyed demodulator. The information is available for input to a remote device which is responsive thereto for performing any of a variety of automated functions.

20 Claims, 2 Drawing Figures

RECEIVER FOR A DISTRIBUTION NETWORK POWER LINE CARRIER COMMUNICATION SYSTEM

BACKGROUND OF THE INVENTION

1. Field of the Invention:

This invention relates, in general, to communication receivers and, more specifically, to receivers for a distribution network power line carrier communication system.

2. Description of the Prior Art:

Generally, a distribution network communication system includes a central communication terminal which produces an outgoing communication signal intended for at least one remote communication terminal, usually located at a customer's premises. An injection point circuit, located at a substation or other convenient location, receives the outgoing communication signal through a telephone link or the like. The injection point circuit transmits a carrier signal, modulated by an information signal responsive to the received outgoing communication signal, over a utility's power distribution network. The remote communication terminal, on receiving the transmitted signal, performs the desired automated functions and, when appropriate, sends a response signal, in the form of a carrier signal modulated by an information signal, back to the central communication terminal. Receivers would, of course, be employed in the remote communication terminal and in the injection point circuit. More sophisticated communications systems requiring signal repeaters would use additional receivers. Irrespective of the remote device in which it is incorporated, the receiver is coupled to the power distribution network such that it receives the carrier signal; the carrier signal is then amplified, filtered and demodulated.

There are several techniques for modulating a carrier signal with an information signal so as to impress the information upon the carrier. In one such technique, phase shift keying modulation, PSK, the information signal shifts the instantaneous phase of the carrier between predetermined discrete values. Phase shift keying receivers capable of receiving, amplifying, and demodulating PSK signals are well known and understood in the prior art.

One prior art receiver technique for amplifying and demodulating a phase shift keyed modulated sinusoidal carrier signal transmitted on a distribution network power line communication system provides for initial high pass and low pass filtering followed by amplification with an automatic gain controlled amplifier. Excessive signal peaks are then attenuated by a clipper circuit and the signal passed through a bandpass filter. Following a second amplifier stage, again with automatic gain control, the signal is hard limited wherein the sinusoidal waveform is transformed to a square wave. Finally, the modulated carrier signal is demodulated.

The primary objection to this prior art receiver is its expense due to the large number of receiver stages utilized. For example, it requires two stages of amplification, both with automatic gain control. Since hundreds of receivers are used in a typical distribution network power line carrier communication system, the individual receiver cost must be kept low, consistent with proper performance, to make the overall communication system economical. Further, this receiver's noise performance is not satisfactory given the environment (i.e., a distribution power line network) in which it must operate.

The earliest prior art technique for coupling the above-discussed receiver to a distribution network power line is voltage coupling, i.e., by use of a capacitor. See, for example, U.S. Pat. No. 4,142,178, issued to Whyte et al., which is assigned to the assignee of the present invention. While successful for typical overhead substations with 4-6 feeders per bus, capacitive coupling has not performed satisfactorily for underground systems. Underground systems have greater load concentration at the substation bus, where it is not unusual to encounter at least twenty to twenty-five feeders on a single bus and possibly as many as forty-eight feeders in a large urban substation. The resultant driving point impedance may be as low as one ohm at the carrier frequency. This requires excessive power amplification at the injection point to provide sufficient signal amplitude at the most remote receiver location. In fact, it may require several kilowatts of signal power. Also, capacitive coupling is both a dangerous and expensive method of coupling the receiver to the distribution power line. Finally, these capacitive coupling techniques are strictly passive, i.e., no gain stages.

Another prior art coupling technique uses inductive coupling with fixed gain. See, for example, U.S. Pat. No. 4,016,429 issued to Vercellotti et. al. which is assigned to the assignee of the present invention. When high magnitude noise or carrier signals are encountered by this type of receiver, the electronics saturates thereby causing the lose of signal data. To overcome this objection manual gain control was added. Manual gain control is, however, both cumbersome and time consuming. Also, since noise varies with time and the distribution feeder choosen to carry the signal, manual gain adjustment still often results in saturation of the electronics or insufficient amplification. Use of an automatic gain control eliminates these manual gain adjustments.

One prior art automatic gain control technique uses a junction field effect transistor to control the gain of the amplification stage. See *Electronics*, Aug. 16, 1973, pages 99 through 100. Automatic gain control is accomplished by connecting the drain-source circuit of a field effect transistor between the amplifier input and ground; in cooperation with the amplifier feedback circuit, the drain-source resistance, which is dependent on the signal magnitude, controls the amplifier gain. While this gain control technique eliminates manual gain adjustment, it requires both positive and negative supply voltages, adding expense and space requirements to the receiver. Further, this automatic gain control has no provision for varying the signal level at which gain control will be triggered.

These disadvantages in the prior art are overcome by the present invention through its use of magnetic coupling; simplified, and less costly amplification and signal conditioning circuits; and an improved automatic gain control circuit design. These and other advantages are discussed in detail below in the Description of the Preferred Embodiment.

SUMMARY OF THE INVENTION

A receiver for a distribution network power line carrier communication system is disclosed. The receiver is magnetically coupled to the distribution power line. The received modulated carrier signal is then amplified by an amplifier with automatic gain control. The automatic gain control circuit includes two reference DC voltages to determine the carrier signal magnitude at which the automatic gain control will turn on. The principal AGC element is a variable resistance element which, in cooperation with the amplifier feedback circuitry, determines the gain of the amplifier. The amplifier output signal is conditioned by passing it through several filter and clipper stages and hard limited (changing its waveform from a sinusoid to a square wave). The demodulator processes the square wave modulated carrier signal, separating the information signal from the carrier signal.

DESCRIPTION OF THE PREFERRED EMBODIMENT

Figure 1:
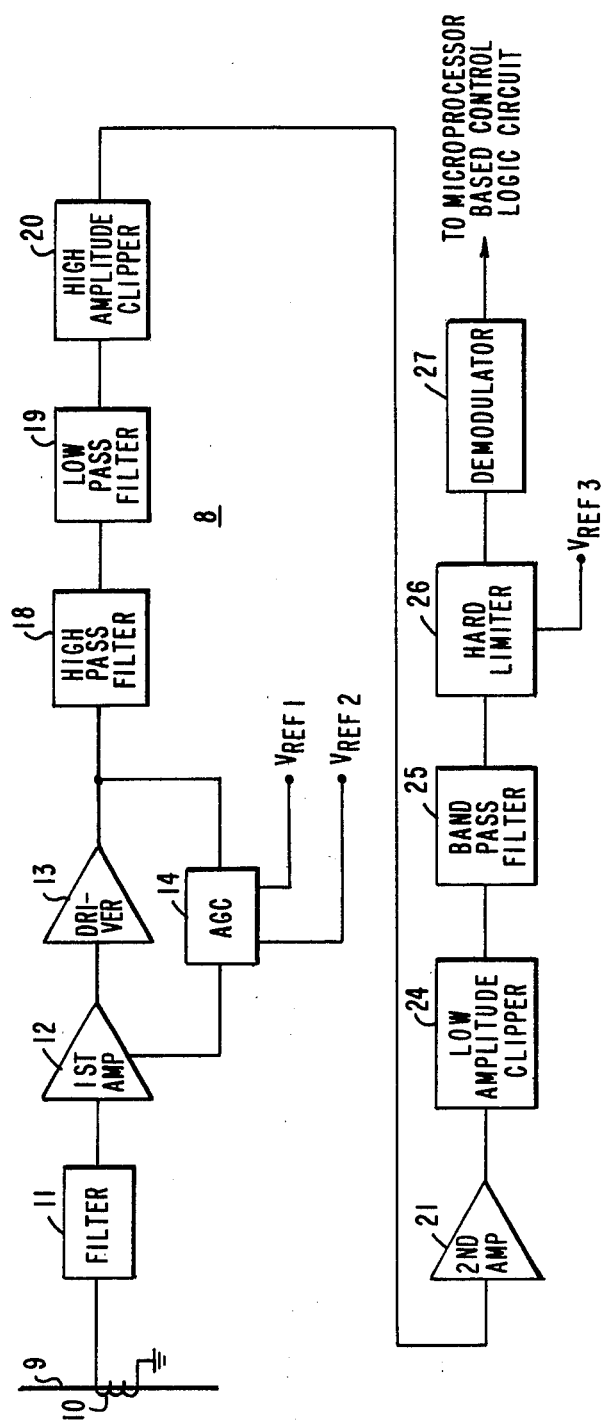
FIG. 1 is a block diagram of a receiver constructed according to the teachings of the present invention.

Turning to FIG. 1, a block diagram of a receiver 8 constructed according to the teachings of the present invention is shown. The receiver 8 is one element included within various types of remote devices used in the distribution network power line carrier communication system. These remote devices perform various automated functions including: automatic reading of utility meters, selective load control, and load continuity checks. An inductor 10 couples the receiver 8 to a distribution power line 9. The distribution power line is a small portion of a utility's power distribution network (not shown). The power distribution network is used to transmit a modulated carrier signal produced by injection point circuitry (not shown) which is not a feature of the present invention. The reader desiring a detailed discussion of a power distribution network carrier system should refer to U.S. patent application Ser. No. 252,682 filed Apr. 09, 1981.

The received sinusoidal modulated carrier signal is processed through a filter 11. The inductor 10 and the filter 11 serve as a resonant frequency filter tuned to the carrier frequency of the received carrier signal and having a bandwidth sufficient to ensure proper reception of that signal. A first amplifier 12 is responsive to the filtered received carrier signal. The amplified signal is input to a driver 13. An output signal of the driver 13 is an input signal to an automatic gain control circuit 14. Two reference DC voltages $V_{REF1}$ and $V_{REF2}$, supplied to the automatic gain control circuit 14, determine the points at which the automatic gain control circuit 14 is activated. An output signal of the automatic gain control circuit 14 is input to the first amplifier 12 to control the gain thereof.

The output signal of the driver 13 is then serially processed through a high pass filter 18, a low pass filter 19, and a high amplitude clipper 20. In one embodiment of the present invention the driver 13 may be located at an appreciable distance from the high pass filter 18 necessitating the use of coaxial cable (not shown) between these receiver stages. The driver 13 provides an output signal sufficient for driving this coaxial cable. The high pass filter 18 removes low frequency noise that might deteriorate the modulated carrier signal, including sixty Hz power line voltage. The corner frequency of the high pass filter 18 is approximately three kilohertz. Similarly, the low pass filter 19, with a corner frequency of approximately twenty-five kilohertz, removes some of the high frequency noise. The high amplitude clipper 20 removes signal peaks in excess of approximately 1.2 volts, peak to peak.

The clipped signal is input to a second amplifier 21. The output signal of the second amplifier 21 is serially processed through a low amplitude clipper 24, a bandpass filter 25, and a hard limiter 26. The low amplitude clipper clips signal amplitudes in excess of approximately 0.2 volts, peak to peak, while the bandpass filter 25 removes noise and other undesirable interference from the signal. The circuitry of the hard limiter 26 modifies the sinusoidal waveform at its input to provide a square wave output signal. A third reference DC voltage, $V_{REF3}$, is input to the hard limiter 26, providing proper bias to that circuitry.

A demodulator 27 separates the phase shift keyed modulated carrier signal from the information signal. The information signal is available for input to a microprocessor based control logic circuit (not shown), which processes the information signal in accord with the data contained within it. The control logic circuit and associated hardware are determined by the nature and function of the remote device of which the receiver 8 is a component.

With this receiver configuration, especially the design of the high amplitude clipper 20, the low amplitude clipper 24, and the hard limiter 26, noise performance is substantially improved without distorting any information in the modulated carrier signal.

Figure 2:
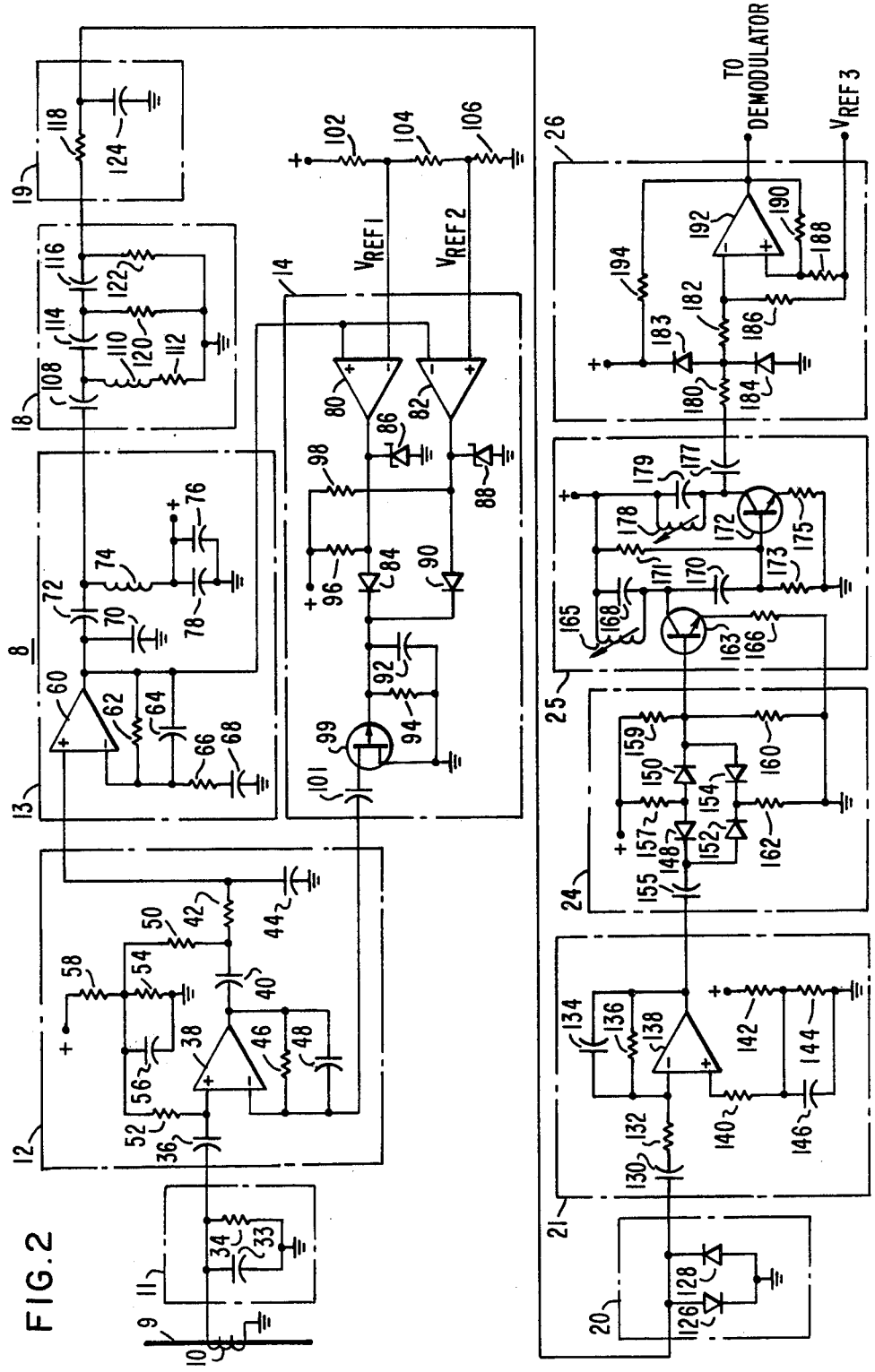
FIG. 2 is an electrical schematic illustrating in detail the coupling element and signal conditioning circuitry of the receiver.

FIG. 2 shows a detailed schematic diagram of the signal conditioning circuitry of the receiver 8. The inductor 10 magnetically links the receiver 8 to the distribution power line 9 such that the modulated carrier signal (a sinusoidal waveform) transmitted by the distribution power line 9 is impressed upon the inductor 10. The modulated carrier signal is then processed by the remaining stages of the receiver 8. The magnetic coupling can be accomplished either by encircling the distribution power line 9 with the inductor 10 or by placing the inductor 10 in proximity to the distribution power line 9. It is not necessary to adjust the distance between the inductor 10 and the distribution power line 9 when the distribution power line voltage is changed. Due to the automatic gain control circuit 14, the inductor 10 can function over a wide range of distribution power line voltages. Due to its relative simplicity, magnetic coupling is considerably cheaper and safer than capacitive coupling since no electrical connections are made between the receiver 8 and the distribution power line 9. Further, when it is desired to change the voltage on a distribution line using capacitive coupling to the carrier communication system, the coupling capacitor must be replaced by one having a higher value. Replacement of the inductor 10 is unnecessary when voltage changes are made.

The inductor 10 is electrically connected in parallel to both a capacitor 33 and a resistor 34. This parallel configuration is connected to a positive input terminal of an operational amplifier 38 via a capacitor 36; the other end of this parallel configuration is connected to ground. The capacitor 33 and the resistor 34 comprise the filter 11.

An output terminal of the operational amplifier 38 is connected to ground via the series combination of a capacitor 40, a resistor 42, and a capacitor 44. The output terminal of the operational amplifier 38 is also connected to a negative input terminal thereof via the parallel combination of a resistor 46 and a capacitor 48. The series combination of a resistor 50 and a resistor 52 is connected between the positive input terminal of the operational amplifier 38 and the junction between the capacitor 40 and the resistor 42. The junction between the resistor 50 and the resistor 52 is connected to ground via the parallel combination of a resistor 54 and a capacitor 56. The junction between the resistor 50 and the resistor 52 is also connected to a positive supply voltage (not shown) via a resistor 58. The operational amplifier 38 with the associated resistors and capacitors comprises the first amplifier 12.

A positive input terminal of a power operational amplifier 60 is connected to the junction between the resistor 42 and the capacitor 44. An output terminal of the power operational amplifier 60 is connected to ground via a capacitor 70, and connected to a negative input terminal thereof via the parallel combination of a resistor 62 and a capacitor 64. The negative input terminal of the power operational amplifier 60 is also connected to ground via the series combination of a resistor 66 and a capacitor 68. One terminal of capacitor 72 is connected to the output terminal of the power operational amplifier 60; the other terminal of the capacitor 72 is connected to a positive supply voltage (not shown) via a series inductor 74. The power supply is also connected to ground via the parallel combination of a capacitor 76 and a capacitor 78. The power operational amplifier 60 with the associated resistors, capacitors, and inductor, comprises the driver 13.

The output terminal of the power operational amplifier 60 is connected to a positive input terminal of a voltage comparator 80 and a negative input terminal of a voltage comparator 82. The output terminal of the voltage comparator 80 is connected to a gate terminal of a field effect transistor 99 via a junction diode 84. The output terminal of the voltage comparator 80 is also connected to ground via a Zener diode 86. The output terminal of the voltage comparator 82 is connected to the gate terminal of the field effect transistor 99 via a junction diode 90. The output terminal of the voltage comparator 82 is also connected to ground via a Zener diode 88. The gate terminal of the field effect transistor 99 is connected to ground via the parallel combination of a capacitor 92 and a resistor 94. The source terminal of the field effect transistor 99 is connected to ground; the drain terminal thereof is connected to the negative input terminal of the operational amplifier 38 via a capacitor 101. The output terminals of the voltage comparators 80 and 82 are connected to a positive supply voltage (not shown) via respectively, a resistor 96 and a resistor 98.

DC reference voltages, $V_{REF1}$ and $V_{REF2}$ are generated as follows. A positive supply voltage is connected to ground via the series combination of a resistor 102, a resistor 104, and a resistor 106. The junction of the resistor 102 and the resistor 104 is connected to the negative input terminal of the voltage comparator 80; the voltage at this junction is designated $V_{REF1}$. Similarly, the junction of the resistor 104 and the resistor 106 is connected to the positive input terminal of the voltage comparator 82; the voltage at this junction is designated $V_{REF2}$. The voltage comparator 80, the voltage comparator 82, the field effect transistor 99, and their associated resistors and capacitors comprise the automatic gain control circuit 14.

The automatic gain control circuit 14 functions as follows. To achieve automatic control of gain on both the positive and negative portions of an output signal (including both the modulated carrier signal and noise) of the power operational amplifier 60, the resistors 54 and 58 bias the operational amplifier 38 and the power operational amplifier 60 to provide the output signal of the power operational amplifier 60 with a positive DC offset voltage. The DC offset voltage serves as a zero baseline with the positive and negative output signal excursions disposed above and below this baseline. As previously noted, this AC signal with DC offset is then applied to the positive input terminal of the voltage comparator 80 and the negative input terminal of the voltage comparator 82. Further, the negative input terminal of the voltage comparator 80 and the positive input terminal of the voltage comparator 82 are both biased with the positive DC voltages $V_{REF1}$ and $V_{REF2}$, respectively. This biasing scheme creates an effective ground at a point halfway through the resistor 104. As a result the voltage comparator 80 controls the gain of the operational amplifier 38 during positive portions of the output signal of the power operational amplifier 60 and the voltage comparator 82 performs likewise during negative portions.

The voltage comparators 80 and 82 act as comparators with each having its output in the normally low logic state. If the signal on the positive input terminal of the voltage comparator 80 exceeds $V_{REF1}$, the output of voltage comparator 80 changes to a high logic state. The voltage comparator 82 functions in a similar manner such that when the amplitude of the signal applied to the negative input terminal thereof is less than $V_{REF2}$, the output of the voltage comparator 82 changes to a high logic state.

When the output of the voltage comparator 80 changes to a high state, the junction diode 84 is forward biased allowing the capacitor 92 to charge through the resistor 96 from the positive supply voltage. The capacitor 92 charges for the duration of time during which the output of voltage comparator 80 is in a high state. The charge build-up on the capacitor 92 reverse biases the gate-source junction of the field effect transistor 99 thereby increasing its drain-source resistance and decreasing the current flow into the drain terminal. The gain of the operational amplifier 38 is determined by the following equation:

$$\text{Gain} = 1 + (R46/R_{FET})$$

where $R_{FET}$ = Drain-Source Resistance of FET99. As can be seen, increasing the drain source resistance of the field effect transistor 99 causes a decrease in the gain of the operational amplifier 38.

The voltage comparator 82 and the associated components function in a similar manner. When the output of the voltage comparator 82 changes to a high state, the junction diode 90 is forward biased allowing the capacitor 92 to charge through the resistor 98 from the positive supply voltage. The capacitor 92 charges for the duration of time during which the output of voltage comparator 82 is in a high state. Again, the charging action of the capacitor 92 reverse biases the field effect transistor 99 thereby increasing its drain-source resistance and lowering the gain of the operational amplifier 38.

When the output of the voltage comparator 80 or the output of the voltage comparator 82 returns to a low state, the capacitor 92 discharges through the resistor 94. This action forward biases the field effect transistor 99 lowering its drain source resistance and raising the gain of the operational amplifier 38.

The Zener diodes 86 and 88 function to limit the voltage charge acquired by the capacitor 92. So long as the output of the voltage comparators 80 or 82 remains high, the capacitor 92 will continue charging through the resistors 96 or 98 until completely charged. Without the Zener diodes 86 and 88, the voltage drop across the capacitor 92 when fully charged would be equivalent to the positive supply voltage. If the capacitor 92 was permitted to charge to this voltage, when the output of the voltage comparators 80 or 82 dropped to a low state it would take the capacitor 92 an excessive time to discharge to the point where the field effect transistor 99 would again be biased below its pinch-off voltage and the gain of the operational amplifier 38 increased. The Zener diodes 86 and 88 are installed to limit the charge acquired by the capacitor 92, thereby decreasing the time it will take for the field effect transistor 99 to reach a bias voltage below pinch-off as the capacitor 92 discharges.

Among the many advantages of this automatic gain control design are its ability to lower amplifier gain in response to positive and negative signal or noise peaks using only a single positive power supply voltage. The carrier signal voltage level at which the AGC is activated is easily adjustable by changing the ohmic values of the resistor 102, the resistor 104, and the resistor 106. Also, the charging and discharging of the capacitor 92 provides a gradual change in the bias voltage of the field effect transistor 99 and, therefore, a gradual adjustment in the gain of the operational amplifier 38.

By way of example only, and without intending to limit the scope of this invention, assume the following components have the values given:

R94=4.7 megaohms

R96=20 kilohms

R98=20 kilohms

C92=0.1 microfarads

With this embodiment, the attack time constant of the automatic gain control circuit 14 is two milliseconds thereby allowing gain reduction on very short transients without the lose of data contained in the modulated carrier signal.

Returning to the detailed schematic of FIG. 2, the junction of the capacitor 72 and the inductor 74 is connected to ground via the series combination of a capacitor 108, an inductor 110, and a resistor 112. The series combination of a capacitor 114 and a capacitor 116 is connected to the junction between the capacitor 108 and the inductor 110. The junction between the capacitor 114 and the capacitor 116 is connected to ground via a resistor 120; the other terminal of the capacitor 116 is also connected to ground via a resistor 122. The foregoing components comprise the high pass filter 18 of the receiver 8.

A resistor 118 is connected to the junction between the capacitor 116 and the resistor 122. The other terminal of the resistor 118 is connected to ground via a capacitor 124. These components comprise the low pass filter 19. The parallel combination of a junction diode 126 and a junction diode 128 is connected between ground and the junction between the resistor 118 and the capacitor 124. These junction diodes form the high amplitude clipper 20 of the receiver 8.

The junction between the resistor 118 and the capacitor 124 is connected to the negative input terminal of an operational amplifier 138 via the series combination of a capacitor 130 and a resistor 132. The output terminal of the operational amplifier 138 is also connected to the negative input terminal thereof via the parallel combination of a capacitor 134 and a resistor 136. A positive supply voltage (not shown) is provided to the positive input terminal of the operational amplifier 138 via the series combination of a resistor 142, a resistor 144, and a capacitor 146, and a resistor 140. The junction between the resistor 144 and the capacitor 146 is connected to ground and the junction between the resistor 142 and the resistor 144 is connected to the junction between the resistor 140 and the capacitor 146. The operational amplifier 138 and its associated components comprise the second amplifier 21 of the receiver 8.

A junction diode 148 is connected in series to a junction diode 150 such that the anode terminal of the junction diode 148 is connected to the anode terminal of the junction diode 150. Similarly, a junction diode 152 is connected in series with a junction diode 154 such that the cathode terminal of the junction diode 152 is connected to the cathode terminal of the junction diode 154. These two series combinations are then connected in parallel such that the cathode terminal of the junction diode 148 is connected to the anode terminal of the junction diode 152 and the cathode terminal of the junction diode 150 is connected to the anode terminal of the junction diode 154. A capacitor 155 is connected between the output terminal of the operational amplifier 138 and the junction between the junction diode 148 and the junction diode 152. The junction between the junction diode 150 and the junction diode 154 is connected to ground via a resistor 160 and connected to a positive voltage supply (not shown) via a resistor 159. The junction between the junction diode 152 and the junction diode 154 is connected to ground via a resistor 162. The junction between the junction diode 148 and the junction diode 150 is connected to a positive supply voltage (not shown) via a resistor 157. The four junction diodes and their associated components comprise the low amplitude clipper 24 of the receiver 8.

The junction between the junction diode 150 and the junction diode 154 is connected to the base of a transistor 163. The emitter terminal of the transistor 163 is connected to ground via a resistor 166. The collector terminal of the transistor 163 is connected to a positive supply voltage via the parallel combination of a variable inductor 165 and a capacitor 168. The collector terminal of the transistor 163 is connected to the base terminal of a transistor 172 via a capacitor 170. The emitter terminal of the transistor 172 is connected to ground via a resistor 175. The collector terminal of the transistor 172 is connected to a positive supply voltage (not shown) via the parallel combination of a variable inductor 178 and a capacitor 179. The base terminal of the transistor 172 is connected to ground via a resistor 173 and connected to a positive supply voltage via a resistor 171. One terminal of a capacitor 177 is connected to the collector of the transistor 172. The transistors 163 and 172 together with their associated components comprise the bandpass filter 25 of the receiver 8.

The other terminal of the capacitor 177 is connected to the negative input terminal of a voltage comparator 192 via the series combination of a resistor 180 and a resistor 182. The anode terminal of a junction diode 183 is connected between the junction of the resistor 180 and the resistor 182; the cathode terminal of the junction diode 183 is connected to a positive supply voltage (not shown). The anode terminal of a junction diode 184 is connected to ground and the cathode terminal of the junction diode 184 is connected to the junction between the resistor 180 and the resistor 182. The negative input terminal of the voltage comparator 192 is connected to $V_{REF3}$ via a resistor 186. The positive input terminal of the voltage comparator 192 is also connected to $V_{REF3}$ via a resistor 188. A resistor 190 is a feedback resistor connected between an output terminal and the positive input terminal of the voltage comparator 192. The output terminal of the voltage comparator 192 is also connected to a positive supply voltage via a resistor 194. The voltage comparator 192 and its associated components form the hard limiter 26 of the receiver 8. The output of the voltage comparator 192 is connected to a demodulator (not shown in FIG. 2) such as that disclosed in U.S. patent application Ser. No. 77,824.

Briefly reviewing, a receiver for use with a distribution network power line carrier communication system is disclosed. The receiver is magnetically coupled to the distribution power line and includes an automatic gain controlled amplifier to prevent saturation of the receiver electronics. The automatic gain control action is provided by varying the drain-source resistance of a field effect transistor. After the carrier signal is conditioned by several receiver stages, the information signal is separated from the carrier by a demodulator.

What is claimed is:

1. A receiver for receiving a carrier signal modulated by an information signal which is transmitted over a distribution network power line carrier communication system comprising:

coupling means for providing a first signal in response to the carrier signal;

first amplifier means responsive to said coupling means for providing a second signal in response to said first signal, said first amplifier means including first feedback means for determining a gain of said first amplifier means;

means for producing a first and a second reference DC voltages;

first comparator means responsive to said first reference DC voltage and to said second signal;

second comparator means responsive to both said second reference DC voltage and to said second signal;

variable control means responsive to said first and said second comparator means, said variable control means cooperating with said first feedback means such that said gain of said first amplifier means is varied in response to the magnitude of said second signal;

high amplitude clipper means responsive to second signal for providing a third signal;

second amplifier means responsive to said third signal for providing a fourth signal;

low amplitude clipper means responsive to said fourth signal for providing a sinusoidal clipped signal;

hard limiter means responsive to said sinusoidal clipped signal for providing a square wave signal; and demodulator means responsive to said square wave signal for separating the information signal from the carrier signal.

2. The receiver of claim 1 wherein the coupling means includes an inductor.

3. The receiver of claim 2 having a filter means responsive to the inductor and wherein the first amplifier means is responsive to said filter means, said filter means in conjunction with said inductor having a center frequency equal to the frequency of the carrier signal and a bandwidth greater than the bandwidth of the information signal.

4. The receiver of claim 1 wherein the first amplifier means includes an operational amplifier having a positive input terminal, a negative input terminal, and an output terminal, and wherein the feedback means includes a first resistor and a first capacitor connected in parallel between the output terminal and the negative input terminal of said first operational amplifier.

5. The receiver of claim 4 wherein the first operational amplifier is biased such that the positive input terminal is held at a constant DC voltage, thereby creating a zero baseline voltage equal to said constant DC voltage such that the first signal is disposed above and below said zero baseline voltage.

6. The receiver of claim 4 wherein the variable control means includes a field effect transistor having a source terminal connected to ground, a drain terminal connected to the negative input terminal of the first operational amplifier, and a gate terminal responsive to the first and the second comparator means.

7. The receiver of claim 1 including a driver means responsive to the first amplifier means, and wherein the high amplitude clipper means is responsive to said driver means.

8. The receiver of claim 1 wherein the means for supplying the first and the second reference DC voltages includes a series connection of a positive power supply, a first, a second, and a third resistors, said first reference DC voltage being produced at the junction of said first and said second resistors, said second reference DC voltage being produced at the junction of said second and said third resistors.

9. The receiver of claim 1 wherein the first and the second comparator means include a first and a second voltage comparator each having a positive input terminal, a negative input terminal, and an output terminal, and wherein said positive input terminal of said first voltage comparator and said negative input terminal of said second voltage comparator are responsive to the second signal.

10. The receiver of claim 9 wherein the output of the first and the second voltage comparators is normally in the low state.

11. The receiver of claim 9 wherein the negative input terminal of the first voltage comparator is responsive to the first reference DC voltage such that when positive peaks of the second signal exceed said first reference DC voltage the output of said second voltage comparator changes to a high state, thereby utilizing said second signal in analog form to produce digital pulses to control the variable control means.

12. The receiver of claim 9 wherein the positive input terminal of the second voltage comparator is responsive to the second reference DC voltage such that when negative peaks of the second signal are less than the second reference DC voltage the output of said second voltage comparator changes to a high state, thereby utilizing said second signal in analog form to produce digital pulses to control the variable control means.

13. The receiver of claim 9 including a first junction diode having a cathode terminal and an anode terminal with said anode terminal responsive to the output of the first voltage comparator and said cathode terminal connected to the variable control means.

14. The receiver of claim 13 including a second junction diode having a cathode terminal and an anode terminal with said anode terminal responsive to the output of the second voltage comparator and said cathode terminal connected to the variable control means.

15. The receiver of claim 14 wherein the variable control means includes a field effect transistor having a source terminal connected to ground, a drain terminal cooperating with the feedback means of the first amplifier means, and a gate terminal responsive to the cathodes of the first and the second junction diodes.

16. The receiver of claim 15 including a charging capacitor connected between the gate terminal of the field effect transistor and ground, such that a gradual voltage change at said gate terminal is provided.

17. The receiver of claim 16 including a first zener diode having a cathode terminal and an anode terminal with said cathode terminal connected to the output of the first voltage comparator and said anode terminal connected to ground, such that said Zener diode limits the charge acquired by the charging capacitor.

18. The receiver of claim 16 including a second zener diode having a cathode terminal and an anode terminal with said cathode terminal connected to the output of the second voltage comparator and said anode terminal connected to ground, such that said Zener diode limits the charge acquired by the charging capacitor.

19. The receiver of claim 1 wherein the second amplifier means includes an operational amplifier having a feedback means between its input and output terminals.

20. The receiver of claim 1 wherein the means for producing a square wave signal includes voltage comparator having a positive input terminal, a negative input terminal, and an output terminal, and a resistive feedback means between said output terminal and said positive input terminal of said voltage comparator for determining a gain thereof.

* * * * *